United States Patent
Craig et al.

(10) Patent No.: US 7,761,358 B2
(45) Date of Patent: Jul. 20, 2010

(54) REAL TIME FINANCIAL INSTRUMENT IMAGE EXCHANGE SYSTEM AND METHOD

(76) Inventors: Mark S. Craig, R. R. 1, Box 416, Cashion, OK (US) 73016; Michael M. Miller, 1736 Bryant Cir., Norman, OK (US) 73026; Charles H. Downs, Jr., 2900 72nd Ave., SE., Norman, OK (US) 73026

( * ) Notice: Subject to any disclaimer, the term of this patent is extended or adjusted under 35 U.S.C. 154(b) by 0 days.

(21) Appl. No.: 12/420,484

(22) Filed: Apr. 8, 2009

(65) Prior Publication Data

US 2009/0198606 A1    Aug. 6, 2009

Related U.S. Application Data

(63) Continuation of application No. 10/044,679, filed on Jan. 11, 2002, now abandoned.

(51) Int. Cl.
*G06Q 40/00* (2006.01)
(52) U.S. Cl. ............. 705/35; 30/40; 30/45; 358/400; 382/139
(58) Field of Classification Search .......... 705/45, 705/40, 35, 30; 358/400; 382/139
See application file for complete search history.

(56) References Cited

U.S. PATENT DOCUMENTS

| | | | | |
|---|---|---|---|---|
| 5,221,830 A * | 6/1993 | Kern | ............ | 705/30 |
| 5,870,725 A * | 2/1999 | Bellinger et al. | ............ | 705/45 |
| 5,930,778 A * | 7/1999 | Geer | ............ | 705/45 |
| 7,181,430 B1 * | 2/2007 | Buchanan et al. | ............ | 705/45 |
| 7,584,125 B2 * | 9/2009 | Vicknair et al. | ............ | 705/35 |

FOREIGN PATENT DOCUMENTS

JP    2003309755    * 10/2003

* cited by examiner

Primary Examiner—Harish T. Dass
(74) Attorney, Agent, or Firm—McAfee & Taft (57) ABSTRACT

A real time financial instrument image exchange system and method deliver a digital image of a financial instrument (for example, a bank check) very quickly through an image exchange network to a payor institution by promptly forwarding the digital image when it is created at a depositing institution. This may expedite pay or return decisions to be made by payor institutions, which may enable banks to truncate checks, to reduce fraud and its costs, and to facilitate compliance with banking regulations. Such image capture, as well as related data capture, and real-time transfer enable emulation to an item processing system of the payor institution whereby the payor's item processing system processes the image and data as if it did the original capture actually performed at the depositing institution.

15 Claims, 4 Drawing Sheets

REAL TIME FINANCIAL INSTRUMENT IMAGE EXCHANGE SYSTEM AND METHOD

CROSS REFERENCE TO RELATED APPLICATION

This application is a continuation of U.S. patent application Ser. No. 10/044,679 entitled REAL TIME FINANCIAL INSTRUMENT IMAGE EXCHANGE SYSTEM AND METHOD, filed Jan. 11, 2002 now abandoned.

BACKGROUND OF THE INVENTION

This invention relates generally to the electronic handling of financial instruments and more particularly, but not by way of limitation, to the optical imaging and digital processing of tangible bank checks. Within these contexts, the present invention provides a real time financial instrument image exchange system and method by which financial instrument images and data can be exchanged during or after the capture process.

The banking industry has two long-standing goals: check truncation and quick return notification. In a typical check handling process, a bank customer gives a tangible bank check to his or her bank to make a deposit, for example. The check is frequently from another person having his or her account at a different bank, and so to process the check it is eventually packaged with other checks drawn on the same bank and sent to that bank. This involves significant manual handling of the various checks, transportation costs, and time. Check truncation would reduce or eliminate these because with check truncation the bank where checks are first deposited would hold the tangible items for some specified time and then likely destroy them. Should someone later need a destroyed check, however, some record of the check must be retained.

When a check deposited with one bank (the bank of first deposit, or the depositing bank) is drawn on the account of a customer at another bank (the payor bank), whereby the aforementioned check bundling and transporting occur, the depositing bank does not immediately know whether there is some problem with the check it has just received (for example, insufficient funds in the payor bank's customer's account) because of the time it takes the check to be processed and acknowledged by the payor bank. If the check is not to be honored by the payor bank, the payor bank sends a return notice to the depositing bank; however, this may not be for two days or so using the aforementioned manual processing. To avoid a potential financial loss, the depositing bank would prefer not to credit its customer's account until it knows that the check is good; however, in view of the time involved, this may not be practical because of client relations or because of banking regulations requiring some action by the depositing bank before the deposited check can be fully processed through the payor bank. As a result, banks suffer losses because of bad checks.

Attempts have been made to meet these goals of truncation and of early notification that a check is not going to be honored by a payor bank. These attempts include concepts known in the banking industry as electronic data interchange, image processing, and electronic check presentment. Although these prior efforts may provide benefits, we are not aware of a present commercially functional real time financial instrument image exchange system and method as provided by the present invention.

SUMMARY OF THE INVENTION

The present invention provides a novel and improved real time financial instrument image exchange system and method that have the ability to deliver a digital image of a financial instrument very quickly to a payor institution by promptly forwarding the digital image when it is created at a depositing institution. This may expedite the pay or return decisions to be made by the payor institutions, which may enable banks to truncate checks so that the tangible checks do not all need to be forwarded to the banks managing the accounts on which the checks are drawn. This may also enable the early notification of returns, which may reduce fraud and its costs and facilitate compliance with banking regulations regarding check settlement times. The present invention also may have scalability to accommodate any size for the system or implementation of the method and flexibility to interface with different types of existing equipment, systems and methods used by banks.

The present invention includes a data transfer system and method that provide real time image exchange between financial institutions during or after time of initial capture of images (and data) from financial instruments processed for financial institutions. In at least one embodiment, the present invention emulates such image capture, as well as related data capture, to an item processing system of a second financial institution whereby that item processing system processes the captured image as if it did the original capture actually performed at a first financial institution.

One definition of the present invention is as a financial instrument image and data exchange method, comprising: electronically copying, into an entry of an image exchange network, a digital image and a digital data record from a financial instrument processing system for a first financial institution after it is determined that the digital data record identifies a second financial institution; and communicating through the image exchange network, in real time with copying the digital image and the digital data record into the entry, the copied digital image and digital data record for use on behalf of the identified second financial institution.

The present invention also provides a financial instrument image and data exchange method, comprising: within a variable group of financial institutions, capturing at respective sites digital images and digital data records for financial instruments processed at the respective sites; and exchanging, through a computer system communicating with the respective sites and in real time with capturing the digital images and digital data records, the digital images and digital data records with respective ones of the financial institutions identified in the digital data records.

A method in accordance with the present invention for communicating electronic images of tangible financial instruments between financial institutions where tangible financial instruments are first received and financial institutions purportedly having an obligation under the received tangible financial instruments comprises: creating electronic images of tangible financial instruments received at a first financial institution; concurrently with creating the electronic images, storing the created electronic images in a first client image exchange server, which is operatively associated with the first financial institution; concurrently with storing the created electronic images, sending signals encoded to represent at least one of the stored electronic images and to identify a second financial institution to a central image exchange server; and sending the encoded signals from the central image exchange server to a second client image exchange server, which is operatively associated with the second financial institution.

With specific reference to bank checks, the present invention provides a method of processing a tangible bank check having MICR information and drawn on a customer's account at a payor bank. One definition of this method comprises: receiving the bank check at a bank of first deposit different from the payor bank; creating electronic data for the bank check in response to at least part of the MICR information on the bank check and concurrently creating an electronic image of the image of the bank check; and in real time with creating the electronic data and image: transmitting the electronic data and electronic image to a first client image exchange server operatively associated with the bank of first deposit; transmitting the captured electronic data and electronic image from the first client image exchange server to a central image exchange server; and transmitting the electronic data and electronic image from the central image exchange server to a second client image exchange server, the second client image exchange server operatively associated with the payor bank. This can further comprise transmitting at least the electronic data in the second client image exchange server to an item processing system of the payor bank when the electronic data contains correct data.

The present invention also includes a financial instrument capture emulation method that comprises providing to an item processing system for a receiving financial institution, in response to and concurrently with processing a financial instrument in an item processing system for a sending financial institution, a digital image of and a digital data record for the financial instrument. This includes providing the digital image and the digital data record in compatible form for the item processing system for the receiving financial institution such that the item processing system for the receiving financial institution processes the provided digital image and digital data record as if originally captured in the item processing system for the receiving financial institution. This can further include communicating signals defining the digital image and digital data record through an image exchange computer network connected to the item processing system for the sending financial institution and the item processing system for the receiving financial institution. In a particular embodiment, the financial instrument is a bank check processed through a check sorter of the item processing system for the sending financial institution.

A financial instrument image and data exchange system of the present invention comprises: means for capturing a digital image and a digital data record from a financial instrument processing system for a first financial institution at the time it is determined that the digital data record identifies a second financial institution; and means for communicating, in real time with capturing the digital image and the digital data record, the captured digital image and digital data record for use on behalf of the identified second financial institution.

In one embodiment the present invention provides an image exchange system for financial instruments, comprising: a plurality of financial institution item processing systems, each having a sorter that receives tangible financial instruments and provides received tangible financial instruments to MICR detecting equipment and optical imaging equipment of the sorter; a plurality of client image exchange servers, each connected by a respective communication link to obtain data and image signals responsive to the MICR detecting equipment and optical imaging equipment of at least one of the financial institution item processing systems; and a central image exchange server connected to the client image exchange servers such that the central image exchange server mediates real-time transfers of at least image signals between respective ones of the client image exchange servers.

Therefore, from the foregoing, it is a general object of the present invention to provide a novel and improved real time financial instrument image exchange system and method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a diagram of a system in accordance with the present invention, wherein the system directly interfaces with a financial institution's item processing system.

DETAILED DESCRIPTION OF THE PREFERRED EMBODIMENTS

Referring to FIG. 1, a real time financial instrument image exchange system of the present invention comprises a plurality of client image exchange servers 2 used by a plurality of financial institutions. This includes at least servers 2a and 2b in the representation of FIG. 1, but the system and method of the invention preferably are scalable to include other servers as represented by one or more other servers 2n in FIG. 1. The real time financial instrument image exchange system also includes a central image exchange server 4. It is to be noted that "server" as used in this specification and in the claims with regard to the client image exchange servers and the central image exchange server does not refer to a particular type of computer, instead it refers to the function of serving the image and data in the system and method of the present invention.

These servers 2, 4 of the image exchange network of the present invention communicate via any suitable means, one example of which includes routers 6a, 6b, 6c illustrated in FIG. 1 and one or more communication links 7 of any suitable wired (for example, metallic, optical) or wireless type. Each of the paths in the communication link(s) 7 can be any suitable transmission medium over which or through which encoded data signals can be transmitted; non-limiting examples include secure dedicated leased telephone lines, other private or public wire or fiber circuits, private or public wireless communication links, whether direct (for example, dedicated circuit) or indirect (for example, via a global communication network, such as the Internet). The client image exchange servers 2a, 2b, 2n of FIG. 1 are connected via respective links 7a, 7b, 7n, such as including any of the aforementioned types of communication links, to central image exchange server 4. In the FIG. 1 implementation, for example, the central image exchange server 4 may also be connected to the Federal Reserve System 8, third party image archive server(s) 10 providing for extended file archiving, and one or more other digital systems such as ATM switches 12 or host system(s) 14 for one or more of the financial institutions (a bank's item processing system, which is subsequently described, typically connects to that bank's host system as known in the art; non-limiting examples of a host system include the ALLTEL HORIZON, EDS BMIS, and UNISYS ITI host systems).

In the embodiment illustrated in FIG. 1, wherein the system of the present invention directly connects or communicates with an item processing system 18 of a financial institution, the client exchange servers 2 are connected to their respective financial institution item processing system 18 utilizing any suitable connection, one non-limiting example of which is the indigenous method of local connectivity chosen by that financial institution. Item processing systems are known in the art, and non-limiting examples of such systems include ones by IBM, UNISYS, NCR and Advanced Financial Solutions. In the illustrated embodiment of FIG. 1, two item processing systems 18a, 18b are shown, one for each client image exchange server 2a, 2b.

A financial institution that may use the present invention in the manner represented in FIG. 1 may have a single location or facility or multiple ones. Each financial institution provides a place or location where tangible financial instruments to be handled by the present invention, such as paper bank checks 16 (FIG. 2), are deposited with/received by the financial institution. A non-limiting example of such a location is a bank teller site where a customer of a bank gives a bank check to a bank teller. Other non-limiting examples for financial institutions include backroom item processing systems, branch capture systems and remote customer capture facilities.

When the payee/customer of a financial institution deposits an instrument or instruments, each instrument is processed in a known manner through check imaging equipment in the item processing system 18 operatively associated with that financial institution. The institution may maintain such equipment, or it may be provided and used by a third party that performs the financial instrument/item processing for the financial institution. Such equipment can be located at the actual site where the financial instrument is received, or it may be located downstream of such point of deposit (such as at a financial institution's check processing center). In a particular implementation in which financial instruments to be processed have indicia compliant with industry standards for magnetic ink character recognition (MICR) processing, each financial institution also provides for detecting MICR line data on the financial instruments. Such image and MICR processing can be by any suitable equipment and technique as known in the art; non-limiting examples of reader/sorter equipment capable of performing imaging and MICR detecting include the NCR 7780, UNISYSS NDP series, and IBM 3890 check reader/sorters. Image capture can in general occur anywhere within the financial institution's capture environment (for example, the teller location) or within the financial institution's outsourced processing environment (for example, a third party processor), at which time the digital image and its corresponding capture data are collected by the respective client image exchange server if sufficient MICR information has been read. In a particular implementation, sufficient MICR information includes at least the identity of the financial institution to which the financial instrument relates (such as by being drawn on that financial institution).

Such capture equipment of the respective item processing system 18 typically performs two functions: (1) creating a data file upon detecting the MICR line on the financial instrument and (2) creating an electronic image of the financial instrument. The digital signals provided by these two functions may be in separate files or in a combined file, either of which comprises digital electrical or magnetic signals according to the type of temporary or permanent storage devices used. In FIG. 1, a check is received by the institution using the item processing system 18a and processed through a reader sorter 20a including an optical scanner 22a and a MICR reader 24a. In this illustrated embodiment these provide respective files, one for storing in image file storage memory 26a and the other for storing in MICR record database memory 28a. The FIG. 1 implementation also includes a control computer system 30a overseeing operation of the item processing system 18a and handling communications through a router 27a with the financial institution's host system 29a. Comparable features are in the illustrated implementation of the item processing system 18b, as indicated in the drawing by like reference numerals followed by the letter "b". Regardless of the particular structure or nature of the signals or the item processing system, these data and image signals are used to provide information to the respective depositing, or entry, end client image exchange server 2, the central image exchange server 4, the client image exchange server associated with the downstream financial institution called upon to honor the respective instrument (for example, the paying institution), and conventional processing equipment at the downstream financial institution. In general, the downstream financial institution's equipment determines if the financial instrument is to be honored; if it is not to be honored, the downstream financial institution equipment identifies to the respective financial institution client image server 2 the financial instruments that necessitate return.

For a system as illustrated in FIG. 1, each client image exchange server 2 is operatively associated with one or more respective financial institutions. Each client image exchange server 2 is scalable to whatever practical limits may be defined to accommodate sufficiently fast processing for all the financial institutions or parts thereof connected to the respective client image exchange server 2. Each client image exchange server 2 is programmed to accommodate its respective financial institution(s) functioning as a depository institution that receives a financial item to be processed (for example, a bank of first deposit of a paper bank check) or as an end institution purportedly having some obligation or other significance under the instrument received by the depositing or presenting institution (for example, a payor or paying bank). There will typically be at least one client image exchange server 2 operating on behalf of a depository institution and at least one other client image exchange server 2 operating on behalf of a payor or analogous institution for any one transaction; however, if there are transactions between institutions or parts of one institution connected to the same client image exchange server 2, that one client image exchange server can act in both capacities.

The central image exchange server 4 acts as the hub of the network when there are transactions between client image exchange servers 2. The central image exchange server 4 is scalable to accommodate different numbers of client image exchange servers 2. Scalability may be limited by practical considerations, such as speed of processing and communicating, for any particular implementation of the present invention.

Figure 2:
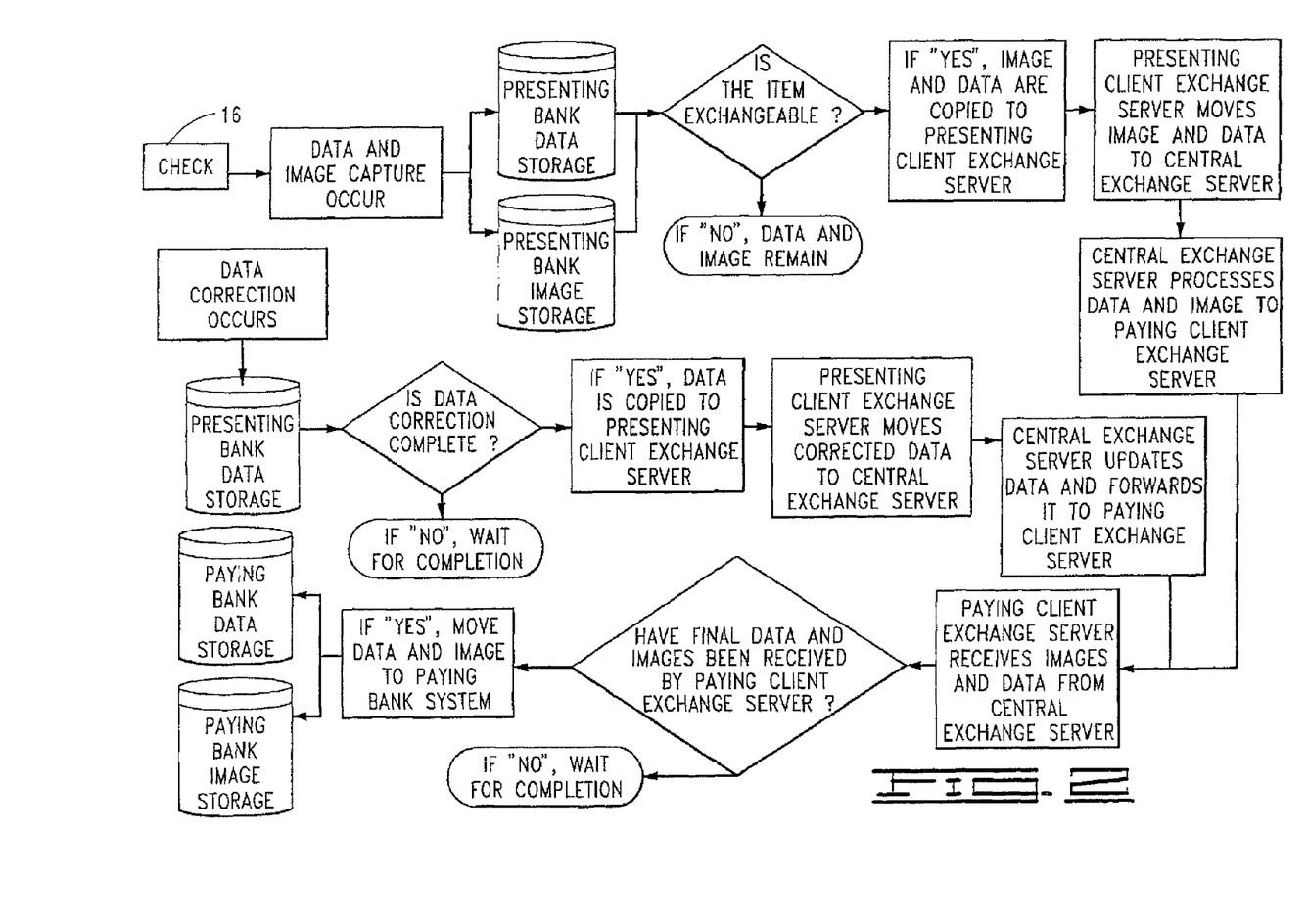
FIG. 2 is a diagram illustrating real time image and data exchange methodology such as can be implemented by the system of FIG. 1 for a check presenting bank and a check paying bank.
Figure 3:
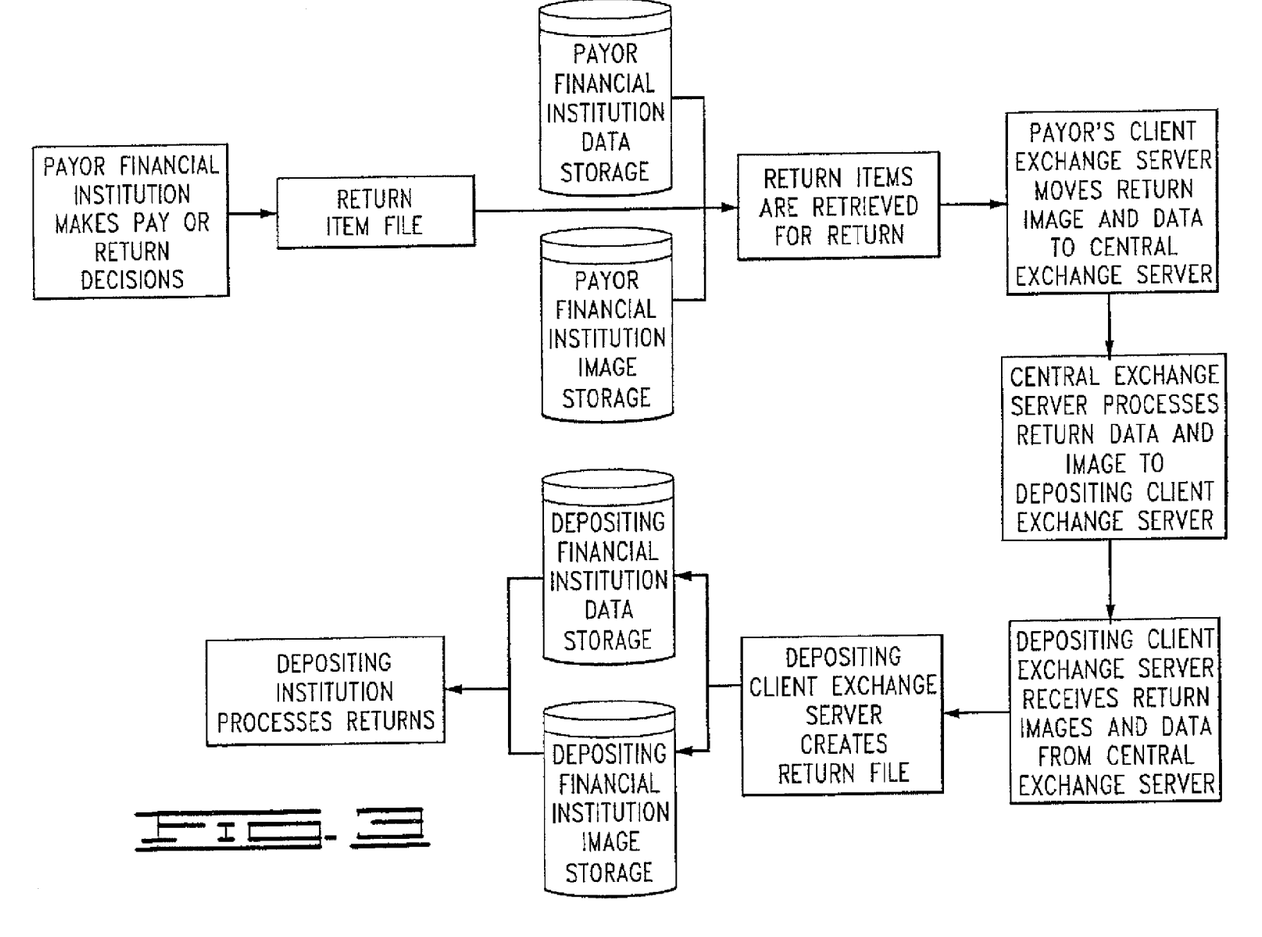
FIG. 3 is a diagram illustrating a return notification methodology that can occur through use of the present invention when a payor financial institution, such as the paying bank in FIG. 2, decides not to honor an item and so issues a return notification to the depositing financial institution, such as the presenting bank of FIG. 2.
Figure 4:
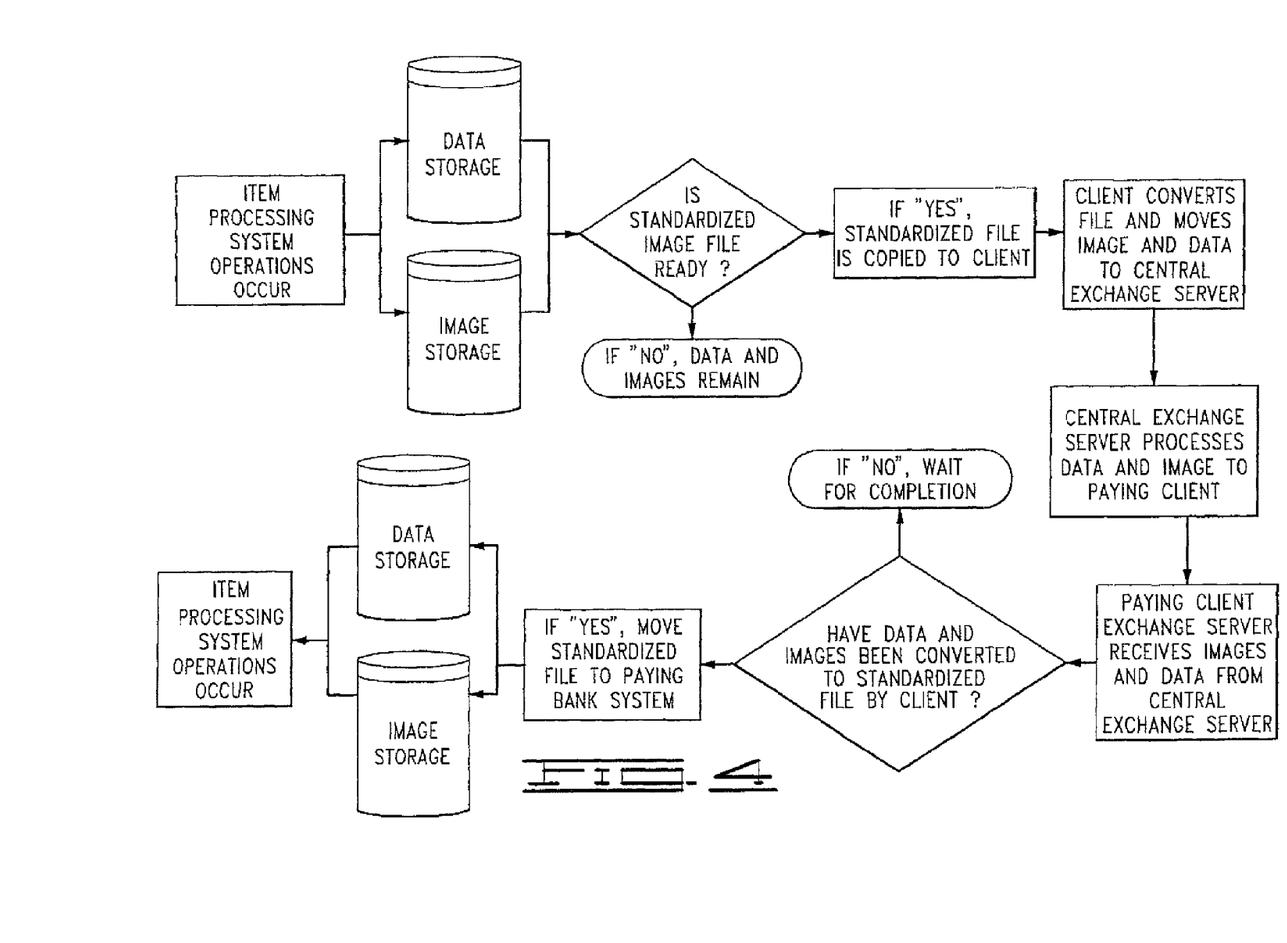
FIG. 4 is a diagram illustrating a methodology of the present invention wherein files in suitable format are received such that a direct interface with an institution's item processing system is not needed.

A methodology of the system of FIG. 1 is illustrated in FIG. 2; this also illustrates programming for the system of FIG. 1 (as do the flow diagrams of FIGS. 3 and 4). A depositing financial institution (the presenting bank in the example of FIG. 2—such as the bank having the item processing system 18a and host system 29a of FIG. 1, although either institution represented in FIG. 1 can function as a presenting bank or a paying bank) facilitates the capture of financial instruments, which are specifically identified as paper bank checks 16 in the example of FIG. 2. This occurs using the reader sorter 20a in the FIG. 1 implementation. As these instruments are captured through operations including those of the optical scanner 22a and MICR reader 24a, for example, digital images and raw data records for the instrument are created and stored in the data and image storage of the item processing system (for example, image storage 26a and data storage 28a in FIG. 1). The client exchange server for the presenting bank (for example, server 2a in FIG. 1) is an entry into the image exchange network, and it monitors the capture of such instruments and begins to immediately electronically copy the captured digital image and raw data for eligible instruments to the central exchange server 4. An instrument is eligible for copying, or in other words is exchangeable as used in FIG. 2, if sufficient data can be discerned in the MICR line data obtained from the MICR reader of the respective item processing system 18 for the FIG. 1 system. In one embodiment, sufficient data needed to enable copying into the respective client image exchange server exists if the paying bank (that is, the bank on which the check 16 is drawn) identity can be determined from the MICR data. The client image exchange server monitors for this by, for example, being programmed to recognize the particular storage format or other relevant parameter(s) of the particular item processing system to which it interfaces and by detecting changes or other characteristic(s) indicating that an image and related data are available; however, other accessing can be used—non-limiting examples include picking up the signals directly from the reader sorter equipment or receiving files communicated to the client image exchange server other than through direct communication with an item processing system. This communicating to the client image exchange server can occur within a fraction of a second of the optical scan and MICR read of a bank check being processed in a conventional item processing system; however, slower transfers can occur during or after capture, but in any event on a basis that occurs sooner than prior batch processing methods.

If the respective client exchange server copies the image and data file(s), the image and data file(s) for that instrument is(are) in turn copied from that client exchange server to the central image exchange server. When data and images are copied to the central exchange server 4, the central server 4 ascertains the paying financial institution from the raw data received from the client exchange server and utilizes this information to copy the financial instrument's digital image and raw data to the paying financial institution's client exchange server (for example, server 2b); this can occur within a matter of seconds, but it can also be slower depending on an actual implementation of equipment and traffic load (yet faster than prior batch processing methods).

As the presenting/depositing financial institution pursues in a conventional known manner, for example, the correction of raw data for each captured financial instrument (such as using character recognition techniques, for example), that institution's client image exchange server monitors such progress and, upon final correction of each raw data element, forwards that information to the central exchange server 4. When final corrected data is copied into the entry-end client image exchange server, that server intervenes in the respective item processing system to "freeze" that respective data file so that it cannot be edited further. Upon receiving corrected data, the central exchange server 4 replaces in its storage memory the raw data with the final corrected data and forwards the data to the respective paying financial institution's client image exchange server, which in turn replaces the respective raw data in its memory with final corrected data and places both the digital image and its corrected data into the paying financial institution's item processing system (for example, the item processing system 18b if its institution is the paying institution identified from the MICR data on the check 16). This is preferably done in such manner as to emulate file input as if that paying institution had actually performed the capture of those financial instruments. This correction process can take from seconds to hours, depending on the correction process and exchange server access implemented by a particular institution and its item processing system; however, the image has already been transferred to the downstream client image exchange server in rapid manner in accordance with the present invention.

FIG. 3 illustrates the flow of a return process if the paying (referred to in FIG. 3 as "payor" since it has refused to pay and thus is not paying at that time) institution refuses to honor the transferred instrument. The payor institution image client server 2 (for example, client exchange server 2b) processes the return file(s) generated by the payor institution's respective item processing system or host system, facilitating the transmission of digital image and data to the central exchange server 4. The central exchange server 4 then records and updates the associated data in the central storage file and transfers the digital image and data to the depositing/presenting client exchange server 2 (for example, server 2a). The depositing client exchange server 2 then creates one or more return files for processing by the depositing financial institution. The central image exchange server 4 provides overall management, including record keeping, with regard to the transactions flowing through it between the client image exchange servers.

FIG. 4 illustrates that depositing institutions may choose not to opt for an installed interface into their item processing system. In that eventuality, the invention is preferably configured to accept any industry standard file of digital images and data in lieu of actively monitoring the item processing system. Items are instead gathered or received by some suitable interface or intermediary and then files in a standard or otherwise recognizable format are presented to the respective entry client exchange server. This entry server interrogates a file received from an institution, breaking its whole into many individual parts representing each digital equivalent of an item for deposit. The process then flows the same as if the items were intercepted within the item processing system as described above. All items received for payment are reconstructed into the required format for import into the payor institution's item processing system. This may be done once or many times per settlement period, based on institution need. Non-limiting examples of industry standard exchange file formats are ANSI X9.37, X9.81, Federal Reserve COF 1.3, and 1.4.

Without limiting the scope of the present invention, more particular information for one or more implementations of the foregoing follows:

Client Image Exchange Server 2

Each client image exchange server includes a computer or computer system that typically is resident at a site with access to the captured digital images of an exchanging institution. Its main function is to queue and report information for sending and receiving. As an institution captures and balances work in its item processing system, for example, digital files of eligible transit items are sent to its entry client server via a local area network connection, for example. Outgoing cash letters regarding check files for respective payor institutions are created here for deposit to the exchange. Inclearing and return items are received here for processing. Incoming adjustments and outgoing adjustment requests are processed or initiated here. Requests for the forwarding of original items are processed and initiated here. Information relating to current or ultimate settlement position is accessed here. Communications to and from other participating institutions are initiated and received here.

Central Image Exchange Server 4

The central image exchange server is a redundant and secure computer or computer system that receives and processes all requests from the client image exchange servers. This central server tracks all activity it processes and posts final settlement totals for all participating institutions utilizing a FedLine connection, for example. This central server maintains a database of historical information relating to the payment of each item presented. The central server tracks return, memo, and adjustment requests and prevents the duplication of entry. This central server archives the images of all items for a predetermined time, and it houses data relative to the exchange process for a predetermined time.

The client or central image exchange servers can be implemented using any suitable hardware and software that can perform the method of the present invention. In one embodiment of the invention, this can include conventional software with customized interfaces between respective components as needed to implement the functions of the invention as described in this specification, including the drawings. Details of such embodiment are within the skill in the art given this explanation, but one specific non-limiting example includes a Dell OptiPlex GX1 computer running Windows 2000 operating system and Sequel Server database software. These communicate through suitable links, such as, for example, ones using routers 6 of any suitable type known in the art (one non-limiting example of which is a Cisco 172.times.router providing communication, encryption and security).

The Process:

All items received from client image exchange servers are archived at the central image exchange server level. The archive is updated with return status if the items are returned or adjusted. Items are transmitted to their respective payor bank client image exchange server; this process begins as soon as the items are available for transmission. Items are aggregated at the payor-end client server until final corrected data is received, at which time the corrected items are inserted into the payor financial institution's item processing system for posting to the host system of that financial institution.

For each settlement deadline (the time at which images and data are stopped for settlement in accordance with exchange rules; for example, the Central Oklahoma Clearing House Association settles all debits and credits as of noon central time each day), the central image exchange server tabulates the current position for each participating institution. Settlement entries are sent to the Federal Reserve via FedLine for the following: debit—total amount of items presented; debit—total amount of items returned; debit—total of adjustment debits; credit—total amount of items deposited; credit—total amount of return items deposited; credit—total amount of adjustment credits. These transactions are posted debit-first to each institution's account, for example.

As each payor institution processes their respective incoming files, they exercise one or more of the following options: payment of the item; return of the item; initiate a request for the original item; initiate an adjustment request for an item; initiate a request for a replacement image of an item.

A request for original initiates to the central image exchange server a request for the depositing institution. The central image exchange server updates the archive database with the request information. When the depositing institution complies with the request, the database is updated accordingly.

Requests for adjustment are routed through the central image exchange server and initiate updates to the archive for the adjustment amounts. The adjustment and image are forwarded to the depositing institution. The respective client image exchange server places this item and request in an "adjustment" queue for processing.

Request for a replacement image occurs when the paying institution is not satisfied with the quality of the image received. The request has priority over other tasks and receives immediate response from the central image exchange server. The image is retrieved from the central archive or from the depositing client image exchange server and immediately forwarded to the paying institution.

Any institution may access any queue at any time to ascertain its current status. Historical settlement totals are available for a user-defined period of time. All central image exchange server archived databases contain an audit trail of activity for each item. Activity records may be reported at item, institution, and global levels. A record of all activity for each institution may be contained in a billing report for each billing period.

An additional feature of the exchange system may include, without limitation as to this or other features, access to third party components. For example, this may include an ability to interface to ATM or debit card switches for balance and stop payment information. This information could be used in conjunction with existing fraud filters to provide nearly immediate return notification. Institutions may elect to implement remote image capture capabilities with select commercial clients. This activity can be routed through the respective client image exchange server for early presentment.

Connectivity.

The communication infrastructure is scalable from small depositing and paying institutions to very large participant institutions. As telecommunication cost continues to decline while the number of image-enabled institutions continues to increase, the business case comparing infrastructure cost to the internal savings generated from image exchange becomes more and more favorable.

The exchange may utilize the latest technology for the secure transmission of data. Utilizing public key infrastructure, data encryption, and a virtual private network, for example, the exchange can be protected from outside entry and provide a complete audit trail of all internal access. No institution should have the ability to access information relative to items it did not deposit, pay or return. Security settings control access by terminal, operator, time of day, institution or any combination thereof, negating any concerns for the integrity of data exchanged.

Archive.

Participating institutions may opt to archive data with third party archive providers. In this instance the central exchange server copies activity to the archive service at the participating financial institution's request.

Thus, the present invention is well adapted to carry out the objects and attain the ends and 1 advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A real time financial instrument image exchange method comprising:
   a first financial institution receiving an individual financial instrument and identifying a second financial institution associated with said financial instrument;
   capturing at said first financial institution a digital image for said financial instrument processed at said first financial institution;
   detecting a MICR line on said financial instrument and creating a data file based on a reading of said MICR line;
   upon identification of said second financial institute, said first financial institute electronically copying, into an image exchange network, the captured digital image and data file; and,
   simultaneously with the step of electronically copying, communicating via an image exchange network the copied digital image and data file to said second financial institute for use on behalf of the identified second financial institution.

2. The method of claim 1, wherein said image exchange network includes a client image exchange server associated with said first financial institute and further comprising the step of determining if the data file is sufficient to identify said second financial institution prior to copying the digital image and data file to said client image exchange server associated with said first financial institute.

3. The method of claim 2, further comprising the step of forwarding the digital image and data file to a central image exchange server.

4. The method of claim 3, further comprising the step of said central image exchange server ascertaining the second financial institution from the data file received from the client exchange server associated with the first financial institute and copying the digital image and data file to the client exchange server associated with the second financial institution.

5. The method of claim 1, wherein each financial instrument is processed immediately upon receipt by said first financial institution.

6. The method of claim 1, wherein the step of reading said MICR line produces errors in said data file and further comprising the step of correcting said data file prior to communicating said data file to said central image exchange server.

7. A financial instrument image and data exchange method comprising:
   a first financial institution capturing digital images of a financial instrument;
   said first financial institution detecting a MICR line on said financial instrument and creating a data file based on a reading of said MICR line;
   concurrently with creating the electronic image, storing the created electronic image in a first client image exchange server, which is operatively associated with the first financial institution;
   concurrently with storing the created electronic image, sending signals to a central image exchange server, said signals encoded to represent the stored electronic image and encoded to identify a second financial institution to a central image exchange server; and,
   sending the encoded signals from the central image exchange server to a second client image exchange server, which is operatively associated with the second financial institution.

8. The method of claim 7, further comprising the step of determining if the data file is sufficient to identify said second financial institution prior to storing the digital image and data file in said first client image exchange server.

9. The method of claim 7, wherein each financial instrument is processed immediately upon receipt by said first financial institution.

10. The method of claim 7, wherein the step of reading said MICR line produces errors in said data file and further comprising the step of correcting said data file prior to communicating said data file to said central image exchange server.

11. The method of claim 7, further comprising the step of said central image exchange server ascertaining the second financial institution from the data file received from the client exchange server associated with the first financial institute and copying the digital image and data file to the client exchange server associated with the second financial institution.

12. A financial instrument capture emulation method comprising:
   a presenting financial institution receiving an individual financial instrument;
   using a first client exchange server associated with said presenting financial institution to capture a digital image and raw data for said financial instrument processed at said first financial institution, said client exchange server concurrently forwarding said digital image and raw data to a central exchange server;
   said central exchange server ascertaining a paying institution associated with said raw data and said central exchange server concurrently copying said digital image and raw data to a second client exchange server associated with said paying institution;
   said presenting institution correcting the raw data for said financial instrument;
   said presenting institution using said client image exchange server to monitor the correction of said raw data;
   said client image exchange server automatically freezing the corrected data to prevent further editing and automatically forwarding the corrected data to said central exchange server;
   said central exchange server replacing said raw data with the corrected data;
   said central exchange server forwarding said corrected data to said second client exchange server;
   said second client exchange server replacing said raw data with said corrected data and places said digital image and said corrected data into a item processing system associated with said paying institution thereby generating a file input which emulates a file originally captured by said paying institution.

13. A method as defined in claim 12, wherein the financial instrument is a bank check processed through a check sorter of the item processing system for the sending financial institution.

14. A method as defined in claim 13, wherein providing the digital image and digital data to the item processing system for the receiving financial institution further includes communicating copies of signals from the check sorter through an image exchange computer network connected to the item processing system for the sending financial institution and the item processing system for the receiving financial institution.

15. A method as defined in claim 12, wherein providing the digital image and digital data to the item processing system for the receiving financial institution further includes communicating signals defining the digital image and digital data through an image exchange computer network connected to the item processing system for the sending financial institution and the item processing system for the receiving financial institution.

* * * * *